United States Patent
Yamaguchi

(10) Patent No.: US 7,065,519 B2
(45) Date of Patent: Jun. 20, 2006

(54) PROGRAM, METHOD AND SYSTEM FOR SEARCHING CONTENT, AND OPERATOR QUESTIONING PROCESSING SYSTEM

(75) Inventor: Hiroshi Yamaguchi, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 10/307,397

(22) Filed: Dec. 2, 2002

(65) Prior Publication Data

US 2004/0002946 A1 Jan. 1, 2004

(30) Foreign Application Priority Data

Jun. 28, 2002 (JP) ............................. 2002-190696

(51) Int. Cl.
*G06F 17/30* (2006.01)
(52) U.S. Cl. ..................... 707/3; 707/2; 707/4; 707/5; 707/10
(58) Field of Classification Search ................ 707/2, 707/3, 4, 5, 10, 102, 104.1
See application file for complete search history.

(56) References Cited

U.S. PATENT DOCUMENTS

| | | | | |
|---|---|---|---|---|
| 3,676,851 | A * | 7/1972 | Eastman | 714/6 |
| 5,497,488 | A * | 3/1996 | Akizawa et al. | 707/6 |
| 5,619,692 | A * | 4/1997 | Malkemus et al. | 707/2 |
| 5,634,051 | A * | 5/1997 | Thomson | 707/5 |
| 5,659,729 | A * | 8/1997 | Nielsen | 707/3 |
| 5,701,469 | A * | 12/1997 | Brandli et al. | 707/102 |
| 5,704,060 | A * | 12/1997 | Del Monte | 707/104.1 |
| 5,913,208 | A * | 6/1999 | Brown et al. | 707/3 |
| 6,311,178 | B1 * | 10/2001 | Bi et al. | 707/3 |
| 6,327,590 | B1 * | 12/2001 | Chidlovskii et al. | 707/5 |
| 6,522,782 | B1 * | 2/2003 | Pass et al. | 382/218 |
| 6,529,903 | B1 * | 3/2003 | Smith et al. | 707/7 |
| 6,556,710 | B1 * | 4/2003 | Pass et al. | 382/170 |
| 6,564,206 | B1 * | 5/2003 | Ikeda | 707/3 |
| 6,650,561 | B1 * | 11/2003 | Batson et al. | 365/49 |
| 6,687,144 | B1 * | 2/2004 | Batson et al. | 365/49 |
| 6,718,326 | B1 * | 4/2004 | Uga et al. | 707/6 |
| 6,751,612 | B1 * | 6/2004 | Schuetze et al. | 707/4 |
| 6,771,525 | B1 * | 8/2004 | Roth | 365/49 |
| 6,828,121 | B1 * | 12/2004 | Chen | 435/69.1 |
| 6,845,024 | B1 * | 1/2005 | Wanzakhade et al. | 365/49 |
| 6,847,977 | B1 * | 1/2005 | Abajian | 707/102 |
| 6,865,575 | B1 * | 3/2005 | Smith et al. | 707/10 |
| 6,889,225 | B1 * | 5/2005 | Cheng et al. | 707/100 |
| 6,915,297 | B1 * | 7/2005 | Chou | 707/5 |
| 6,938,168 | B1 * | 8/2005 | Gomez et al. | 726/5 |
| 6,957,272 | B1 * | 10/2005 | Tallegas et al. | 709/238 |

* cited by examiner

*Primary Examiner*—Frantz Coby
(74) *Attorney, Agent, or Firm*—Staas & Halsey LLP

(57) ABSTRACT

A method and system for searching a first content group stored in a user terminal using given keywords, displaying a search result in a list using a web browser, and storing IDs corresponding to content referred to by the user in a reference history storage unit. After this, when the user searches a second content group stored in the support server, the server receives keywords and reference history from the user terminal and searches the second content group using the keywords. The server then determines whether or not the ID of retrieved content exists in the reference history, and displays contents with IDs in the reference history and content with IDs not existing in the reference history in such a manner that the contents are distinguishable from each other with the Web browser of the user terminal.

18 Claims, 15 Drawing Sheets

FIG.4

| EXAMPLE ID | EXAMPLE CONTENT (QUESTION) |
|---|---|
| 35 | WALLPAPER SET-UP INCORRECTLY... |
| 102 | ITEM THAT WAS PREVIOUSLY ON THE WALLPAPER... |
| 408 | STANDARD WALLPAPER DOES NOT APPEAR... |
| 1095 | FROM APPLICATION CD-ROM... |
| 94 | NEWEST MODEL WINDOWSAVER... |
| ⋮ | ⋮ |

FIG.8

| EXAMPLE ID |
|---|
| 1095 |
| 724 |
| 951 |
| ⋮ |

PROGRAM, METHOD AND SYSTEM FOR SEARCHING CONTENT, AND OPERATOR QUESTIONING PROCESSING SYSTEM

BACKGROUND OF THE INVENTION

1. Field of the Invention

This invention relates to a technology for a process of searching content groups including the same content stored separately at regions such as, for example, in a local memory of a computer or on a site on the Internet. Further, the present invention relates to a system for an operator questioning processing which carries out processing corresponding to questions posed to the user by the operator using search results of the content searching processing.

2. Description of the Related Art

"Content" means data of various formats defined or recommended by an information provider such as, for example, user support help files, question and answer (Q and A) files, example files, and the like.

FIG. 15 shows an example of a content search processing system. In the content search processing system for searching content databases storing examples for resolving problems, a content database 93 within a computer (user terminal) 90 used by the user and a content database 97 provided within a support page server 95 that may be accessed by the user via a network 94 are prepared. Here, the content database 93 and the content database 97 have the same example data as content.

The user first inputs a search keyword into a web browser 91 on the user terminal 90 in order to acquire and refer to examples relating to problem solving and searches the content database 93 using a search processing program 92. The search processing program 92 extracts examples a, b and c . . . as search results and displays these examples a, b and c . . . using the web browser 91. The user selects the example considered to be the most useful from the list of displayed examples a, b, c, . . . by clicking, and resolves the problem by referring to the content of this example. When an example useful in solving a problem cannot be obtained in the search of the content database 93, the user accesses the support page server 95 from the web browser 91 and searches the content database 97. A search processing program 96 of the support page server 95 searches the content database 97 using a search keyword already inputted using the web browser 91 and these search results are displayed in the Web browser 91. If the search target content and the search keyword are the same, the search results for the search processing program 96 are made the same as the search results for the search processing program 92.

Further, it is assumed that the user can question the operator at the support page server 95 and then the user cannot find examples useful in solving the problem in the search results for the content database 93 and the content database 97. In this case, the user asks the operator questions with respect to the support page server 95 so that useful information can be acquired through a repeated exchange of questions, answers or the like between the user and the operator via the web browser 91 and an operator questioning processing program 98.

The user then searches one or both of the content databases stored on their own computer and the content database that is a resource provided on the internet and refers to appropriate examples. If it is determined that the example referred to is not useful, problem solving is achieved by asking questions to the operator.

In the content search processing system shown in FIG. 15, the examples themselves constituting the search targets can be shared in search processing with respect to the content database 93 within the user terminal 90 and the content database 97 within the support page server 95. However, the records on the history of search results the user has referred to are managed separately at the user terminal 90 and the support page server 95. Namely, when the user cannot find an example data indicating the desired way of solution in the search results for the content database 93 of the user terminal 90 so that a further search of the content database 97 of the support page server 95 is carried out. When search processing is carried out using the same search conditions (search keywords) and the content of both the search results is therefore substantially the same. As a result, examples within the initial results of searching the content database 93 already referred to and determined not to be useful by the user are again included in results of searches carried out again for the content database 97 and displayed. At the support page server 95, records of the user referring to examples in the initial results of searching the content database 93 are not also managed at the support page server 95 and unnecessary examples that the user has referred to and determined to not be useful are therefore displayed without being distinguished from examples that have not yet been referred to. This displaying without distinguishing between examples that have already been referred to and examples that have yet been referred to is extremely detrimental to the efficiency with which a user can refer to a search list.

When it is possible for the user to question the operator based on the content search, solutions, examples and the like already referred to by the user and determined not to be useful are limited to the user voluntarily listing these in a questions column for the operator. It is therefore not possible for the operator to be accurately aware of the situation as to what kind of examples have been referred to and whether or not a response has been requested.

On the other hand, in order to respond based on the content described in the questions column, responses duplicating the solutions and examples that have already been referred to and tried by the user are very common. Having content of responses duplicating examples already referred to by the user is therefore extremely detrimental to the efficiency of the problem solving for both the user and the operator. However, it is therefore difficult in reality to list all of the solutions, examples and the like that are confirmed as having been referred to, tried, and been ineffective in the problem column of the operator.

SUMMARY OF THE INVENTION

The object of the present invention is, therefore, to provide a program, method, and system for searching content, wherein a computer will be possible to display a list of retrieved content in such a manner that content already referred to by a user and content not yet referred to by a user are distinguishable from each other, so as to improve the efficiency with which the user refers to content.

It is a further object of the present invention to provide an system of operator questioning processing with using the method for searching content, wherein there is a question request from the user to the operator, the operator can understand what content the user referred to prior to asking the operator a question, duplicity of responses can be avoided, and unnecessary work can be avoided.

A program for searching content with a first content group stored in a first storage unit and a second content group containing similar content as the first content group stored in a second storage unit provided in separately, wherein the program causes a computer to execute the processes of searching the first content group stored in the first storage unit using inputted search conditions; displaying retrieved content as search results of the first content group; acquiring identification information corresponding content selected from the search results of the first content group and storing the identification information as reference history; searching the second content group stored in the second storage unit using the search conditions; acquiring identification information corresponding each retrieved content as search results of the second content group and determining whether or not the identification information corresponding the content retrieved from the second content group exists in the reference history; and displaying the content retrieved from the second content group as search results in such a manner that the content having the identification information in the reference history and the content not having the identification information in the reference history are distinguishable.

Further, a computer-readable medium is for recording the program for searching content with a first content group stored in a first storage unit and a second content group containing similar content as the first content group stored in a second storage unit provided in separately.

In the present invention, the computer executing the search processing program of the present invention takes search conditions designated by the user as input, and searches content groups constituted by, for example, example files stored in the first content storage unit provided at, for example, the local area of the computer terminal using these search conditions. Further, content extracted as search results using the first display process is displayed at the display device. When the user then selects content to be referred to from the content group of the search results, the computer acquires identification information (such as a content ID) for the selected search results content using the reference history storage process for storage as the reference history.

When, for example, a request to search the second content storage unit provided at the web site is received from a user, the content group stored at the second content storage unit provided at, for example, the support page server is searched by the second search process using the search conditions. A determination is made using a determination process as to whether or not content identification information extracted from the search results exists in the reference history. Further, using the second display process, a search results content list is displayed on the display device as search results of a second search process in such a manner that it is possible to distinguish between content where the identification information exists in the reference history and search results content where identification information does not exist in the reference history.

As a result, it is possible for the user to easily discriminate between content already referred to within a content list of the search results at the support page server and content not yet referred to, and the efficiency of referring to content can therefore be improved.

Moreover, an operator questioning processing system having a user terminal storing a first content group stored in a first storage unit and a server storing a second content group containing similar content as the first content group stored in a second storage unit, for carrying out processing for questioning by the user using search results of the first and second content group. Here, the user terminal comprises means for searching the first content group stored in the first storage unit using inputted search conditions; mean for displaying retrieved content as search results of the first content group; means for acquiring identification information corresponding content selected from the search results of the first content group and storing the identification information as reference history; means for inputting question data; and means for sending the question data, the search conditions, and the reference history to the server, And the server comprises means for receiving the question data, the search conditions, and the reference history; means for searching the second content group using the search conditions; and means for determining whether or not identification information of retrieved content as search results of the second content group exists in the reference history and for displaying a list of retrieved content as search results of the second content group in such a manner that the content having the identification information in the reference history and the content not having the identification information in the reference history are distinguishable.

In the operator questioning processing system of the present invention, the user terminal takes search conditions designated by the user as input and searches content groups stored at the first content storage unit provided at, for example, the user terminal using these search conditions. The first search results display processing means then displays the content groups constituted by the search results on the display device. When the user selects content from the content group, the identification information for the selected content is acquired and stored as the reference history. The user then sends the inputted question data, search conditions and reference history to the server.

The server then receives the question data, search conditions and reference history and searches content groups stored in, for example, a second content storage unit managed by the server using the search conditions. A determination is then made as to whether or not search content extracted for the search results exists in the reference history. A search results content list is then displayed, together with the question data, on an operator display device in such a manner that it is possible to distinguish between search results for content where identification information exists in the reference history and search results for content where identification information does not exist in the reference history.

As a result, the situation as in the related art where the user had to disclose content already referred to in question data no longer applies, and operator questioning can be carried out in a more straightforward manner. The operator can also understand which content the user has already referred to so that responses that duplicate content already referred to can be avoided more effective questioning can be carried out.

BRIEF DESCRIPTION OF THE DRAWINGS

FIG. 4 is a view showing an example of search results.

FIG. 8 is a view showing an example of a reference history.

DETAILED DESCRIPTION OF THE PREFERRED EMBODIMENTS

Figure 1:
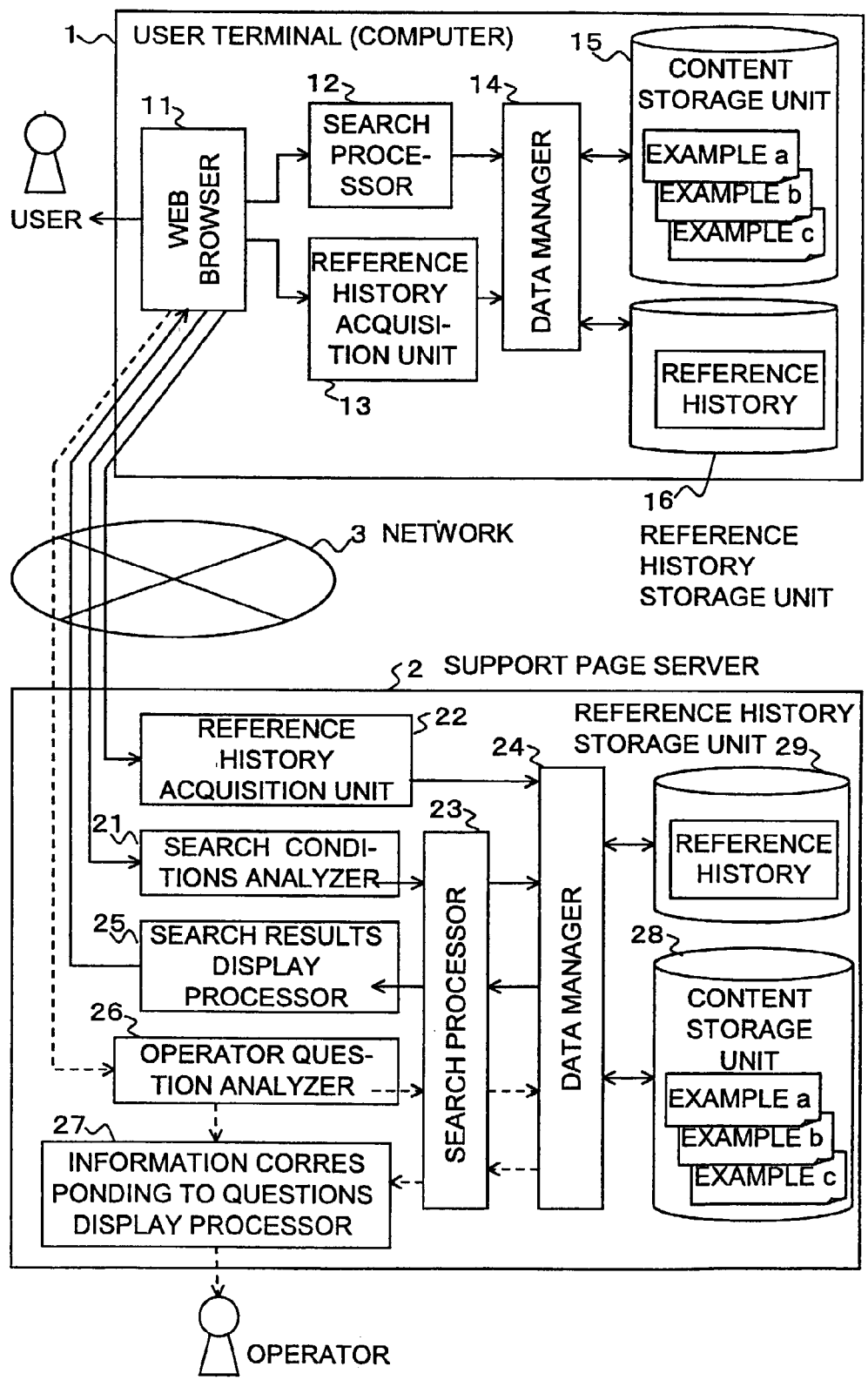
FIG. 1 is a view showing an example configuration for a content search processing system of an embodiment of the present invention.

An example configuration for a content search processing system of a preferable embodiment of the present invention is shown in FIG. 1. The content search processing system is a system for implementing the content search processing program of the present invention. A content search processing system comprises a user terminal 1 that is a computer used by the user, and a support page server 2 providing user support pages.

The user terminal 1 accesses the support page server 2 via a network 3 so that user support services provided by the support page server 2 can be obtained. In this embodiment, the content search processing system searches data of questions-and-answers (Q-and-A) examples for user support use.

The user terminal 1 comprises a web browser 11, a search processor 12, a reference history acquisition unit 13, a data manager 14, a content storage unit 15 and a reference history storage unit 16. The web browser 11 is means for perusing content data such as data of Q and A examples stored in the content storage unit 15 and data provided by the support page server 2. The search processor 12 is means for searching groups of data of examples stored in the content storage unit 15 via the data manager 14. The reference history acquisition unit 13 is means for acquiring identification information history, for example, an example ID of examples selected and referred to by a user from search results of the search processor 12 displayed using the web browser 11, and for storing this information in the reference history storage unit 16 via the data manager 14. The data manager 14 is means for managing data access to the content storage unit 15 and the reference history storage unit 16. The content storage unit 15 is a data storage unit for storing data of examples the search processor 12 is capable of searching. In a specific example, the content storage unit 15 is a database storing a plurality of examples such as example a, example b, example c . . . provided with example ID's. The reference history storage unit 16 is a data storage unit for storing example identification information acquired by the reference history acquisition unit 13 in order of acquisition. In a specific example, examples selected by the user from an example search results list displayed using the web browser 11 are stored in the reference history storage unit 16 in order of selected example ID.

The support page server 2 comprises a search conditions analyzer 21, reference history acquisition unit 22, search processor 23, data manager 24, search results display processor 25, operator question analyzer 26, information corresponding to questions display processor 27, content storage unit 28, and reference history storage unit 29.

The search conditions analyzer 21 is means for receiving data inputted to the web browser 11 sent from the user terminal 1, extracting search conditions such as search keywords and passing these conditions over to the search processor 23. The reference history acquisition unit 22 is means for acquiring a reference history sent from the user terminal 1 and storing this in the reference history storage unit 29. The search processor 23 is means for searching content of the content storage unit 28 via the data manager 24 based on the search conditions passed over from the search conditions analyzer 21 and passing the search results over to the search results display processor 25 or the information corresponding to questions display processor 27. The data manager 24 is means for managing data access to the content storage unit 28 and the reference history storage unit 29. The search results display processor 25 is means for receiving search results from the search processor 23 and performing processing to enable display of the results using the web browser 11 of the user terminal 1. The search results display processor 25 carries out processing in such a manner as to display search result examples as examples where content identification information exists in the reference history and examples where content identification information does not exist in the reference history in a manner distinguishable from each other in a list. The search results display processor 25 can also carry out processing so as to display only examples of the search result examples where content identification information does not exist in the reference history in a list.

The operator question analyzer 26 is means for receiving data inputted to the web browser 11 of the user terminal 1, extracting data for questioning the operator and passes this to the information corresponding to questions display processor 27. The information corresponding to questions display processor 27 is means for receiving question data from the operator question analyzer 26 and receiving search results from the search processor 23 for display on the operator terminal (not shown). The information corresponding to questions display processor 27 carries out processing so as to display, for the search results content, examples where content identification information exists in the reference history and examples where content identification information does not exist in the reference history in a list in such a manner as to be distinguishable from each other. The content storage unit 28 is a data storage unit for storing examples the search processor 23 is capable of searching. In this example, the content storage unit 28 is a database that is identical to the content storage unit 15 or that includes examples stored by the content storage unit 15. The reference history storage unit 29 is a data storage unit for storing reference histories sent from the user terminal 1 acquired via the reference history acquisition unit 22.

The following is a description of the flow of the processing of this embodiment using a process flow. When the user of the user terminal 1 logs on the example search processing program via the web browser 11 in order to perform a content search, the search processor 12 displays the search keyword input window via the web browser 11 and requests the user to input the search conditions.

Figure 2:
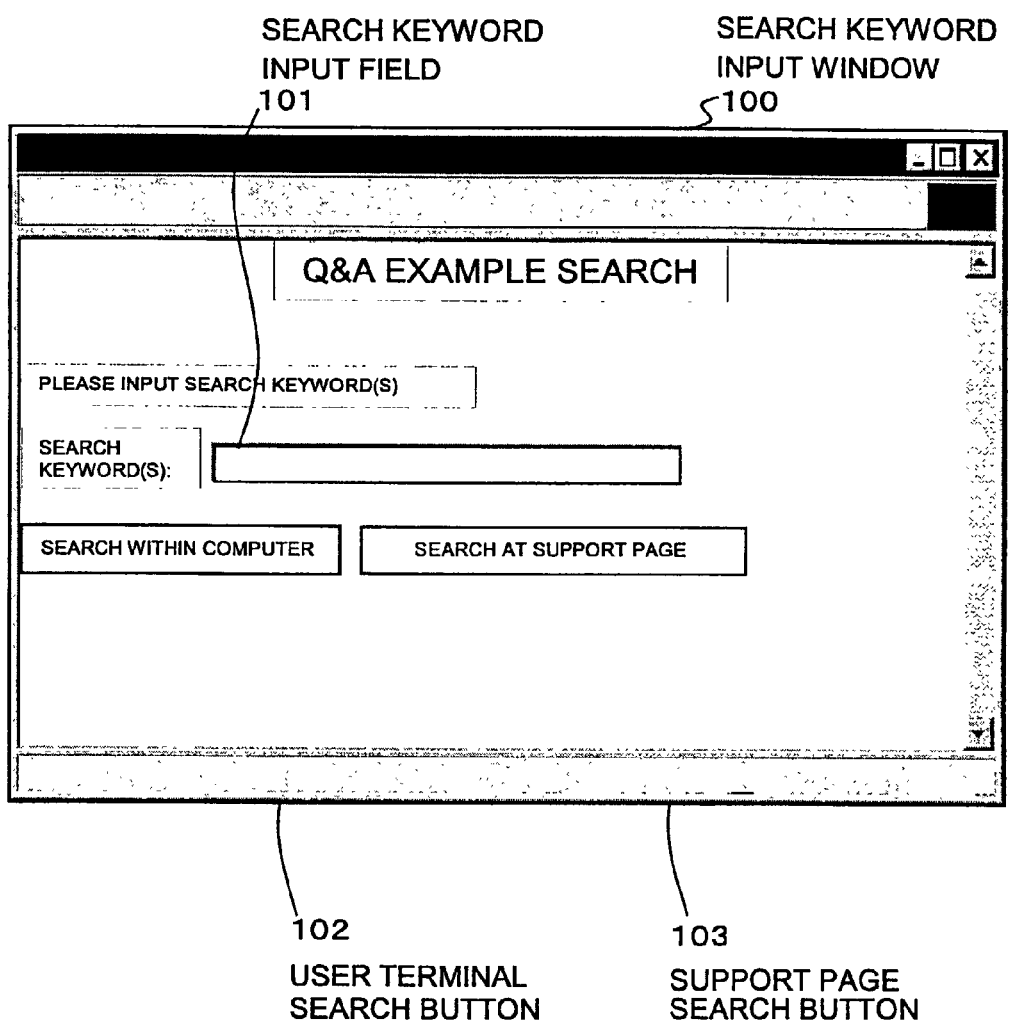
FIG. 2 is a view showing an example of a search keyword input window.

FIG. 2 shows an example of a search keyword input window 100. The search keyword input window 100 comprises a search keyword input field 101 constituting an input field for inputting words or sentences used as search conditions, a user terminal search button 102 for executing searches of the content storage unit 15 of the user terminal 1, and a support page search button 103 for executing a search of the content storage unit 28 of the support page server 2.

The user inputs words and sentences constituted by arbitrary keywords into the search keyword input unit 101, and then selects either the user terminal search button 102 or the support page search button 103 by clicking. When the user terminal search button 102 is clicked, the search keywords inputted to the search keyword input unit 101 is passed over to the search processor 12. Further, when the support page search button 103 is clicked, the search keyword is sent to the support page server 2 together with other data such as transmission source data and the like via the network 3. When the user terminal search button 102 of the search keyword input window 100 of FIG. 2 is clicked, the search processing (taken to be local document search processing in the following) is commenced for the examples of the content storage unit 15 within the user terminal 1 by the search processor 12.

Figure 3:
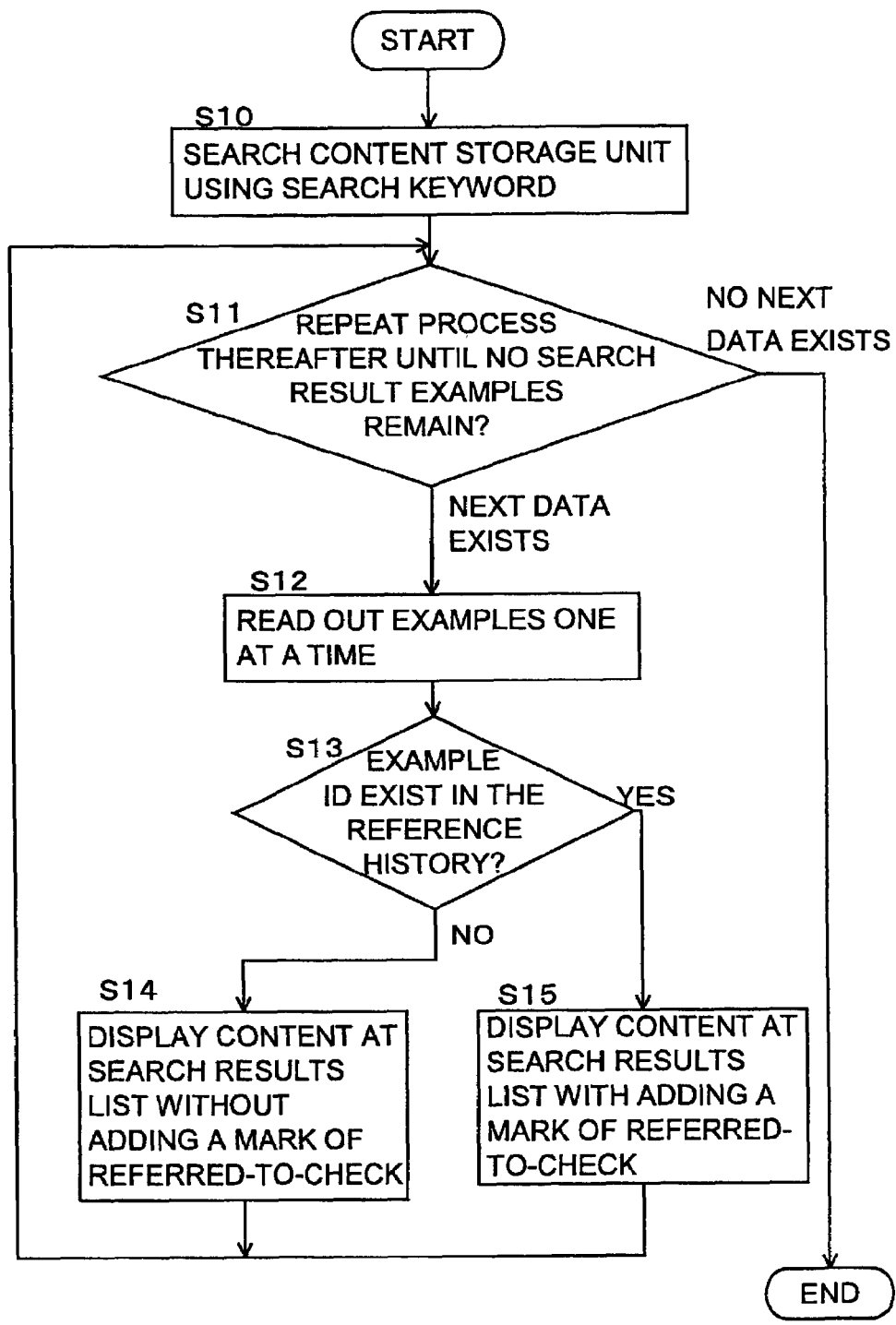
FIG. 3 is a view showing the process flow for local document search processing.

A view of the process flow for local document search processing is shown in FIG. 3. The search processor 12 searches the data of examples in the content storage unit 15 using the search keyword received from the web browser 11 (step S10). FIG. 4 shows an example of the search results of the content search processing. The search results comprise an example ID and question content portion of detailed information for the example taken as an example content displayed at the web browser 11.

The process from step S12 to step S15 is then repeated for each of the examples in the search results until there is no longer any next example data (step S11). First, the search processor 12 extracts search results examples one at a time (step S12), and a determination is made as to whether or not the example ID exists in the reference history stored in the reference history storage unit 16 (step S13). For example, when the example ID does not exist in the reference history in cases such as an initial example search, prescribed display content for this example is added to the search results table and displayed without adding a check mark at referred-to-check column (step S14). On the other hand, when the example ID does exist in the reference history in cases such as where examples in an example search list have already been referred to, display content for this example is added to the search results table and displayed with adding a check mark at referred-to-check column (step S15).

Figure 5:
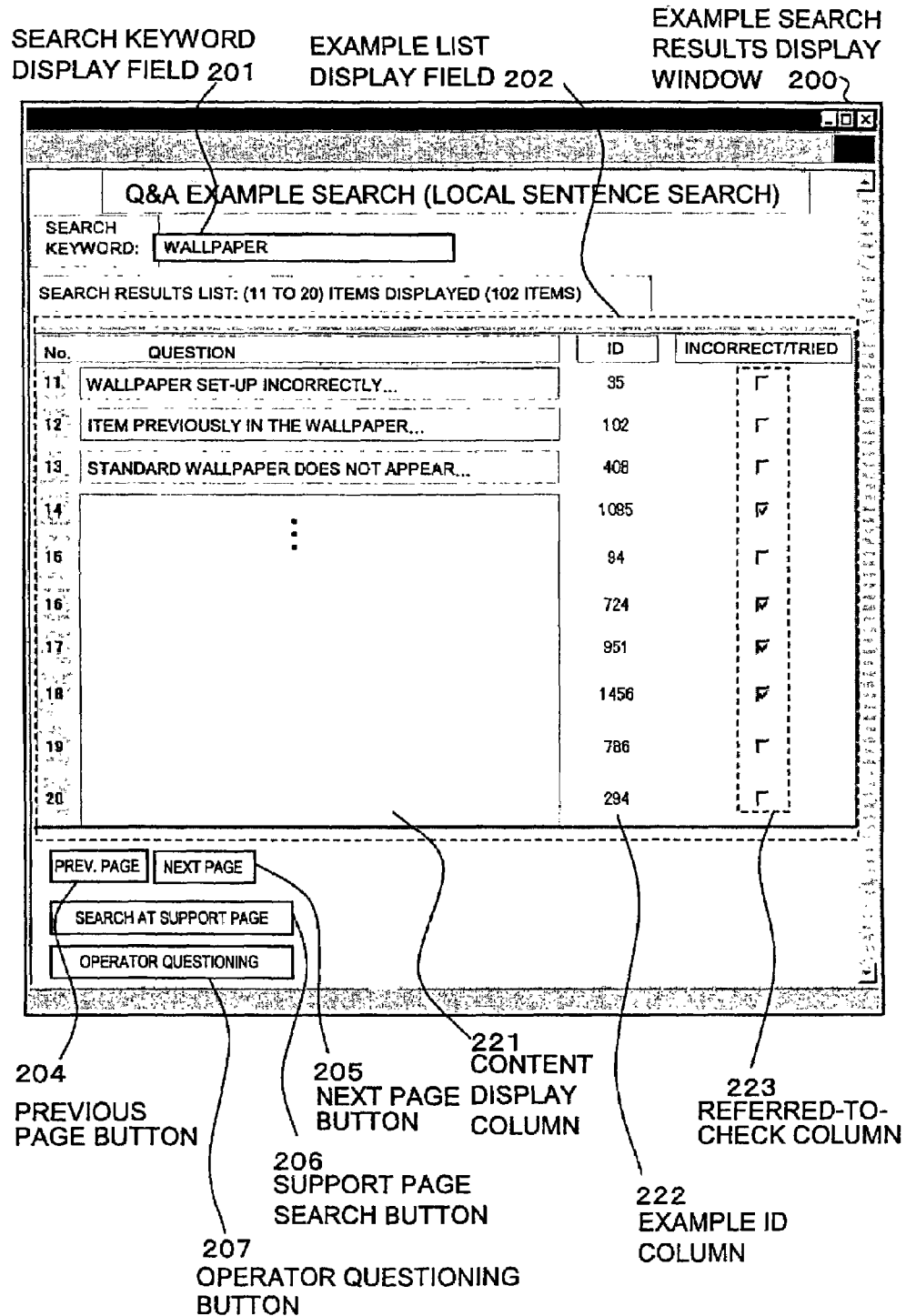
FIG. 5 is a view showing an example of an example search results display window for a local document search.

A view showing an example of an example search results display window 200 for a local document search process is shown in FIG. 5. An example search results display window 200 comprises a search keyword display field 201 for displaying search keywords used in processing, an example list display field 202 for displaying the examples of the search results in a prescribed order, a previous page button 204 for scrolling back to and displaying the previous page for the example list display unit 202, a next page button 205 for scrolling to and displaying the next example list display, a support page search button 206 for executing a search of the content storage unit 28 of the support page server 2, and an operator questioning button 207 for sending questions to the operator.

The example list display field 202 comprises a content display column 221 for the retrieved examples, an example ID column 222 and a referred-to-check column 223. Questioning content is displayed in the content display column 221 of the example list display field 202 as each example content for the search results shown in FIG. 4. Examples amongst these examples having example IDs existing in the reference history are displayed in the referred-to-check column 223 provided with check marks. When example content displayed at the example list display unit 202 is selected by clicking or the like, the web browser 11 extracts more detailed information for the selected example from the content storage unit 15 via the data manager 14 and this information is displayed.

Figure 6:
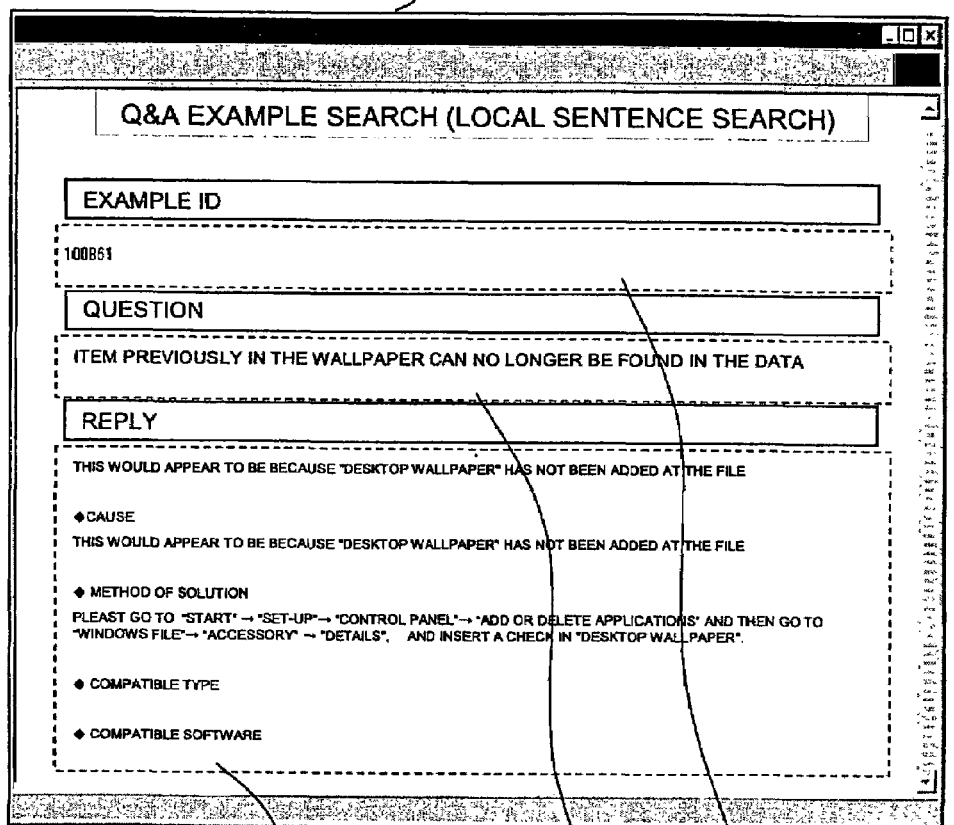
FIG. 6 is a view showing an example of an example detail information display window.

A view showing an example of an example detail information display window 300 is shown in FIG. 6. An example detail information display window 300 comprises an example ID display field 301 for displaying the example ID, a question display filed 302 for displaying questions for detailed information for the examples, and a response display filed 303 for displaying responses to detailed information for the examples. The reference history acquisition unit 13 stores history data of examples referred to every time an example is referred to by the user by displaying at the example detail information display window 300.

Figure 7:
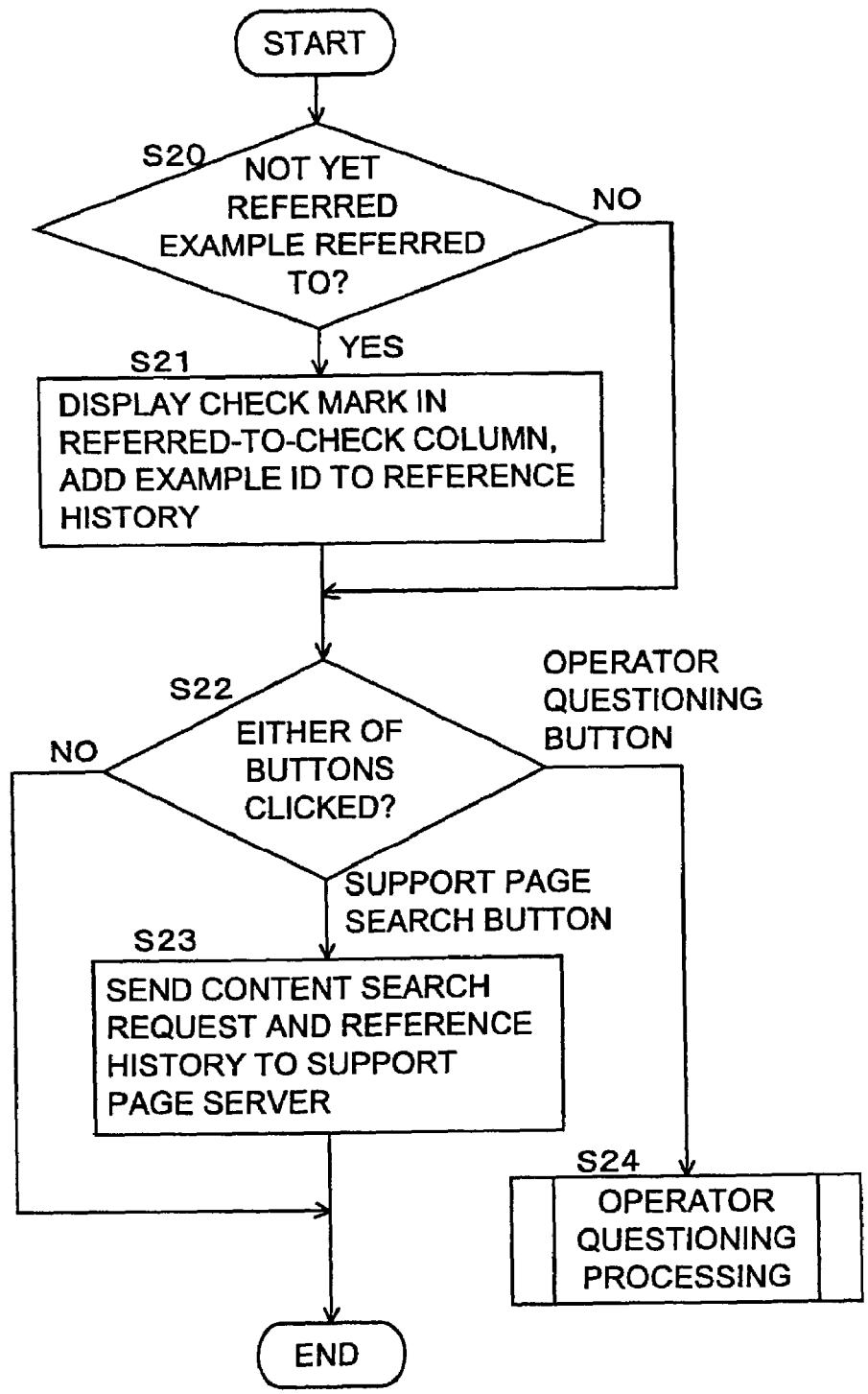
FIG. 7 is a view showing a process flow for a reference history acquisition process.
Figure 8:
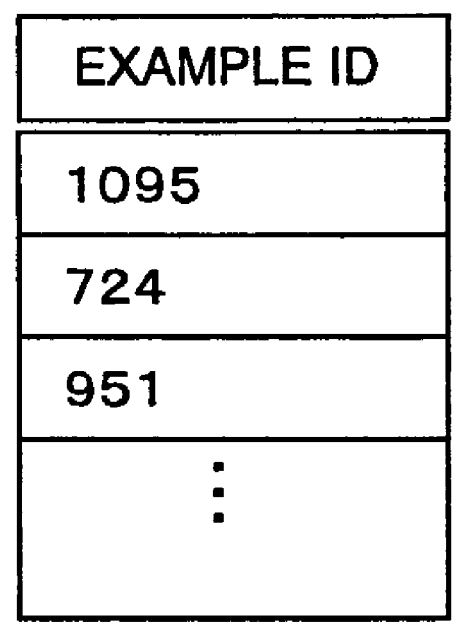

A process flow for a reference history acquisition process is shown in FIG. 7. When one of examples displayed in the example list display field 202 and not yet referred to is selected for reference (step S20), the reference history acquisition unit 13 displays a check mark in the referred-to-check column 223 of the selected example and adds this example ID to the reference history storage unit 16 (step S21). An example of reference history is stored in the reference history storage unit 16 is shown in FIG. 8. In case the examples of the example list display filed 202 of the example search results display window 200 are referred to in the order of examples 1095, 724 and 951, the reference history acquisition unit 13 adds the example ID's to the reference history storage unit 16 in that order. In addition to cases where examples displayed in the example list display field 202 of the example search results display window 200 are selected by clicking or the like and then referred to, example IDs may also be added to the reference history storage unit 16 in cases where the user adds a check-mark to the referred-to-check column 223.

After this, a determination is made as to whether or not an either button of the example search results display window 200 has been clicked (step S22). When the support page search button 206 is clicked, the web browser 11 sends a content search request including the search keywords and the reference history as the search conditions inputted to the search keyword input field 101 of the search keyword input window 100 to the support page server 2 (step S23), and the processing is complete. When the operator questioning button 207 is clicked, a transition is made to operator questioning processing at the support page server 2.

Figure 9:
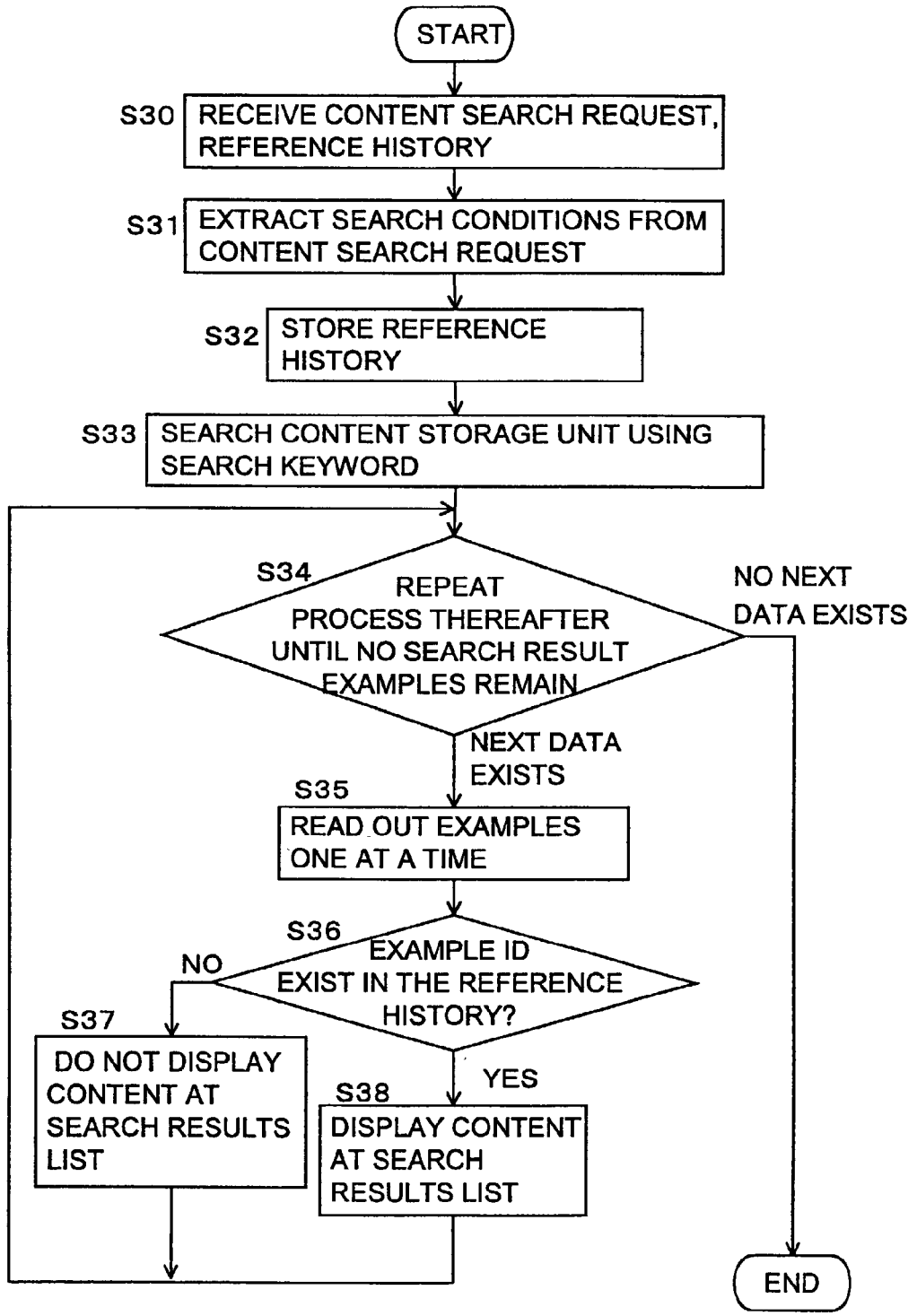
FIG. 9 is a view showing the process flow for support page search processing.

FIG. 9 shows processing flow for content search processing (in the following, this is taken to be support page search processing) at the support page server 2. At the support page server 2, a content search request is received from the user terminal 1 (step S30), the search conditions analyzer 21 acquires a content search request and extracts search conditions (step S31), and the reference history acquisition unit 22 stores the reference history in the reference history storage unit 29 (step S32). The search processor 23 searches the content storage unit 28 via the data manager 24 using search keywords extracted by the search conditions analyzer 21 (step S33). The search processor 23 outputs examples with example IDs added as search results in the same manner as for the search results shown in FIG. 4. The process from step S35 to step S38 is then repeated for each of the examples in the search results until there is no longer any next example data (step S34).

The search results display processor 25 extracts search result examples one at a time (step S35), a determination is made as to whether or not the example ID of the extracted example exists in the reference history of the reference history storage unit 29 (step S36). Then, when the example ID is not present, this example content is displayed in a search results list (step S37), while when the example ID does exist, the example content is not displayed in the search results list (step S38).

Figure 10:
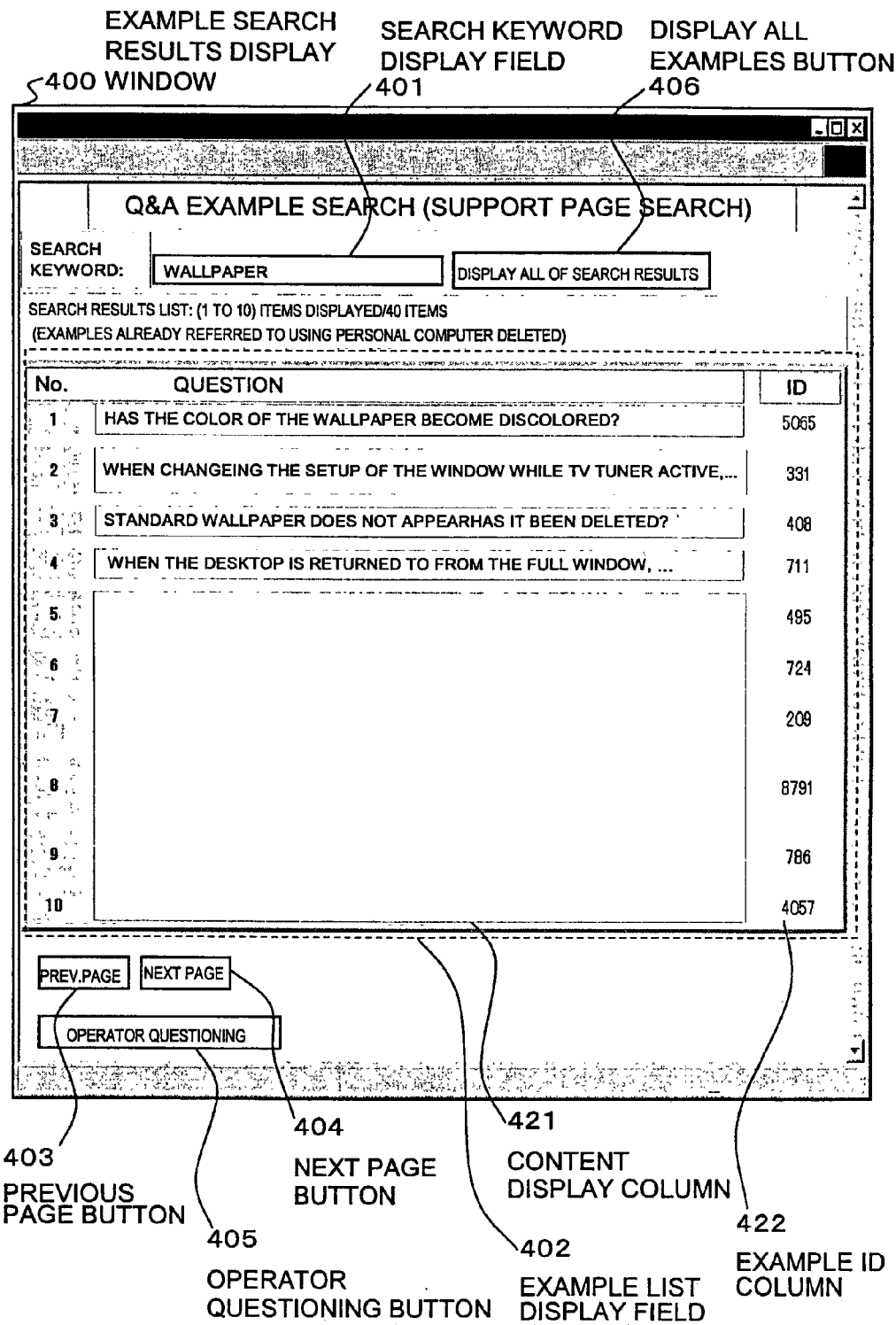
FIG. 10 is a view showing an example of an example search results display window for the case of displaying not yet referred to examples using a support page search.

FIG. 10 shows an example of an example search (support page search) results display window 400. An example search results display window 400 comprises a search keyword display field 401 for displaying search keywords used in processing, an example list display field 402 for displaying the examples of the search results in a prescribed order, a previous page button 403 for scrolling back to and displaying the previous page for the example list display field 402, a next page button 404 for scrolling to and displaying the next example list display, an operator questioning button 405 for carrying out operator questioning processing, and a display all examples button 406 for displaying all of the examples for the search results.

The example list display field 402 comprises a content display column 421 and a examples ID column 422 for displaying content and example IDs of retrieved examples, with only examples of these retrieved examples for which example IDs do not exist in the reference history being displayed in a table. As a result, at the example search results display window 400, the user can take a look only at examples other than examples that have already been referred to when displayed on the example search results display window 200 and examples can therefore be more effectively referred to.

When an example displayed at the example list display field 402 of the example search results display window 400 is selected by clicking or the like, the web browser 11 acquires more detailed information for the selected example from the support page server 2 via the network 3 and displays this information in the same way as for the example detail information display window 300 shown in FIG. 6.

When the display all examples button 406 of the example search results display window 400 is clicked, the search results display processor 25 displays all of the examples extracted as search results at the example list display field 402. An example of an example search results display window 500 for the case of displaying all of the examples of the search results is shown in FIG. 11.

An example search results display window 500 comprises a search keyword display field 501 for displaying search keywords used in processing, an example list display field 502 for displaying all of the examples of the search results, a previous page button 503 for scrolling back to and displaying the previous page for the example list display field 502, a next page button 504 for scrolling to and displaying the next example list display, an operator questioning button 505 for carrying out operator questioning processing, and a display un-referred-to examples button 506 for displaying examples except for those that have already been referred from the search results in a list. When the display un-referred-to examples button 506 is clicked, the example search results display window 400 shown in FIG. 10 is displayed, and only examples of the examples extracted as search results with example IDs that are not present in the reference history are displayed at the example list display field 502.

Figure 11:
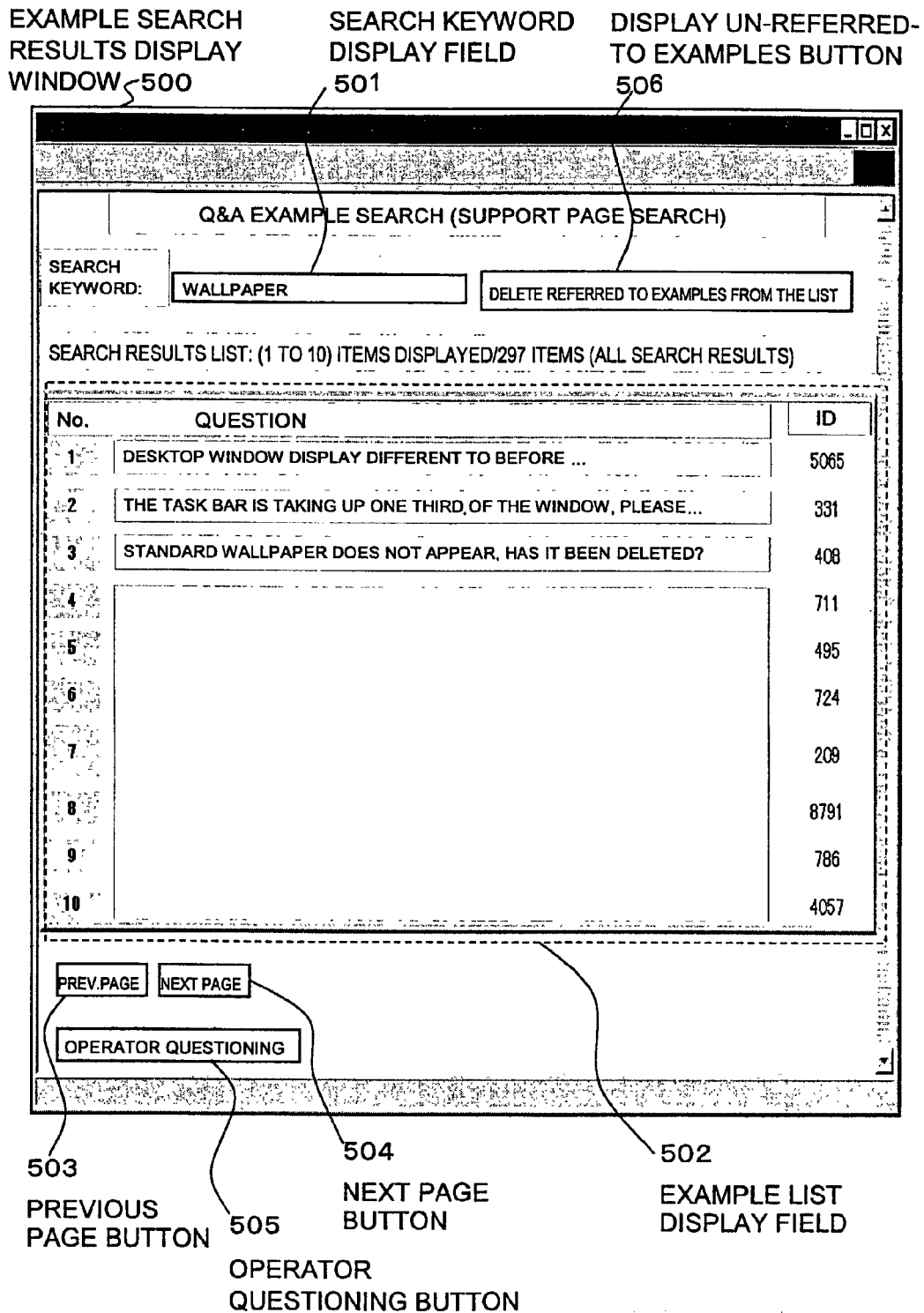
FIG. 11 is a view showing an example of an example search results display window for the case of displaying all examples using a support page search.
Figure 12:
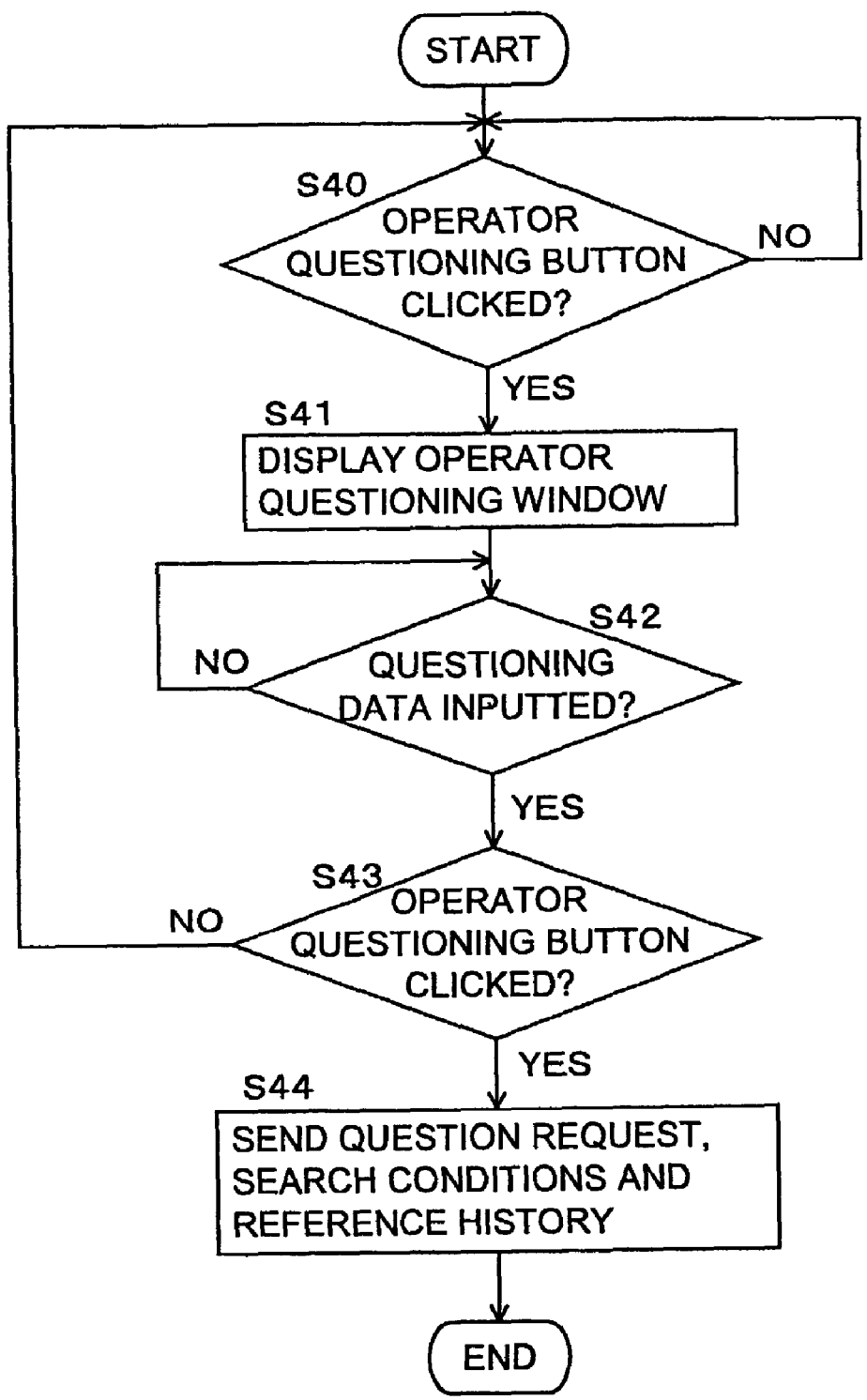
FIG. 12 is a view showing the process flow for operation questioning request processing.

The operator questioning processing is started as a result of clicking the operator questioning buttons 405 or 505 of the example search results display window 400 of FIG. 10 or the example search results display window 500 of FIG. 11. A view showing the process flow for operation questioning request processing is shown in FIG. 12.

Figure 13:
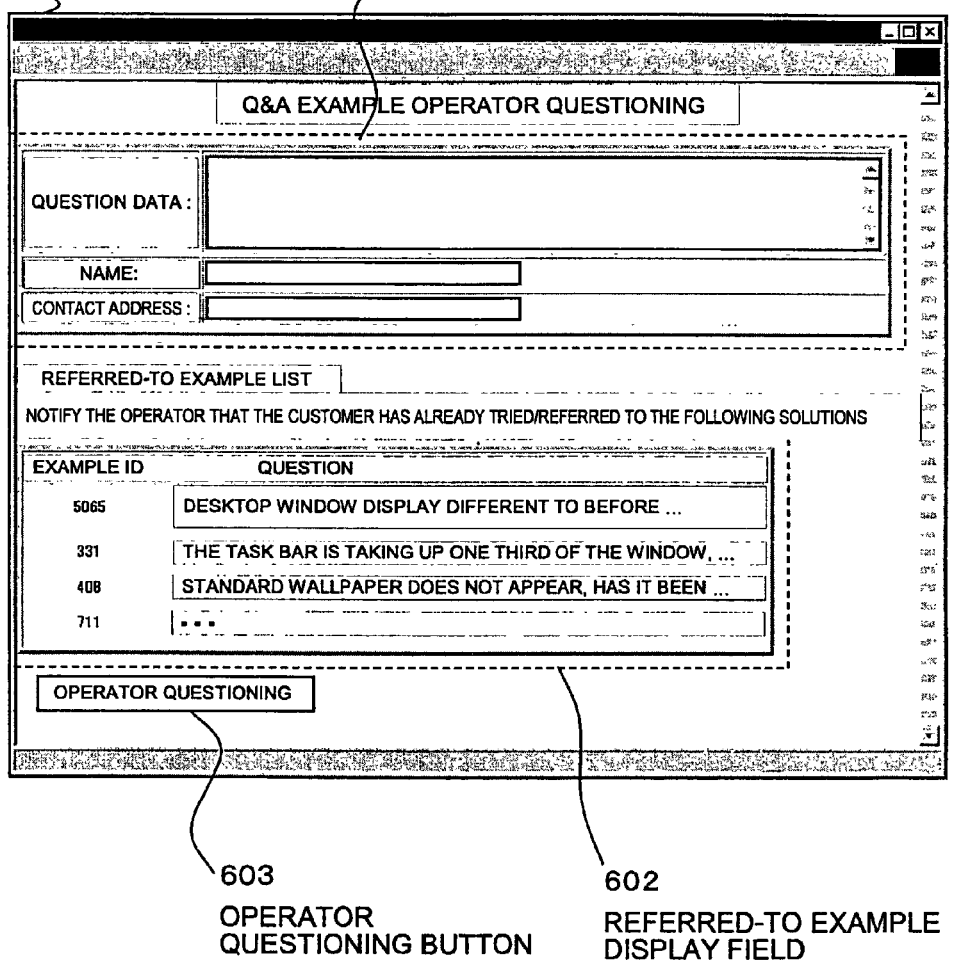
FIG. 13 is a view showing an example of an operator questioning window.

When the operator questioning button 405 or 505 of the example search results display window 400 or 500 is clicked (step S40), the web browser 11 of the user terminal 1 displays an operator questioning window 600 (step S41). A view showing an example of an operator questioning window 600 is shown in FIG. 13. An operator questioning window 600 comprises a questioning data input field 601 for inputting data for asking questions to the operator, user name, and contact mail address, a referred-to example display field 602 for displaying examples in the search results that have already been referred to by the user, that is the examples with example IDs already existing in the reference history storage unit 16, and an operator questioning button 603 for sending question data to the operator.

When question data and the like are then inputted at the questioning data input field 601 of the operator questioning window 600 (step S42), and when the operator questioning button 603 is clicked (step S43), a question request including question data inputted using the questioning data input field 601, already inputted search conditions and reference history of the reference history storage unit 16 are sent to the support page server 2 (step S44) via the network 3.

Figure 14:
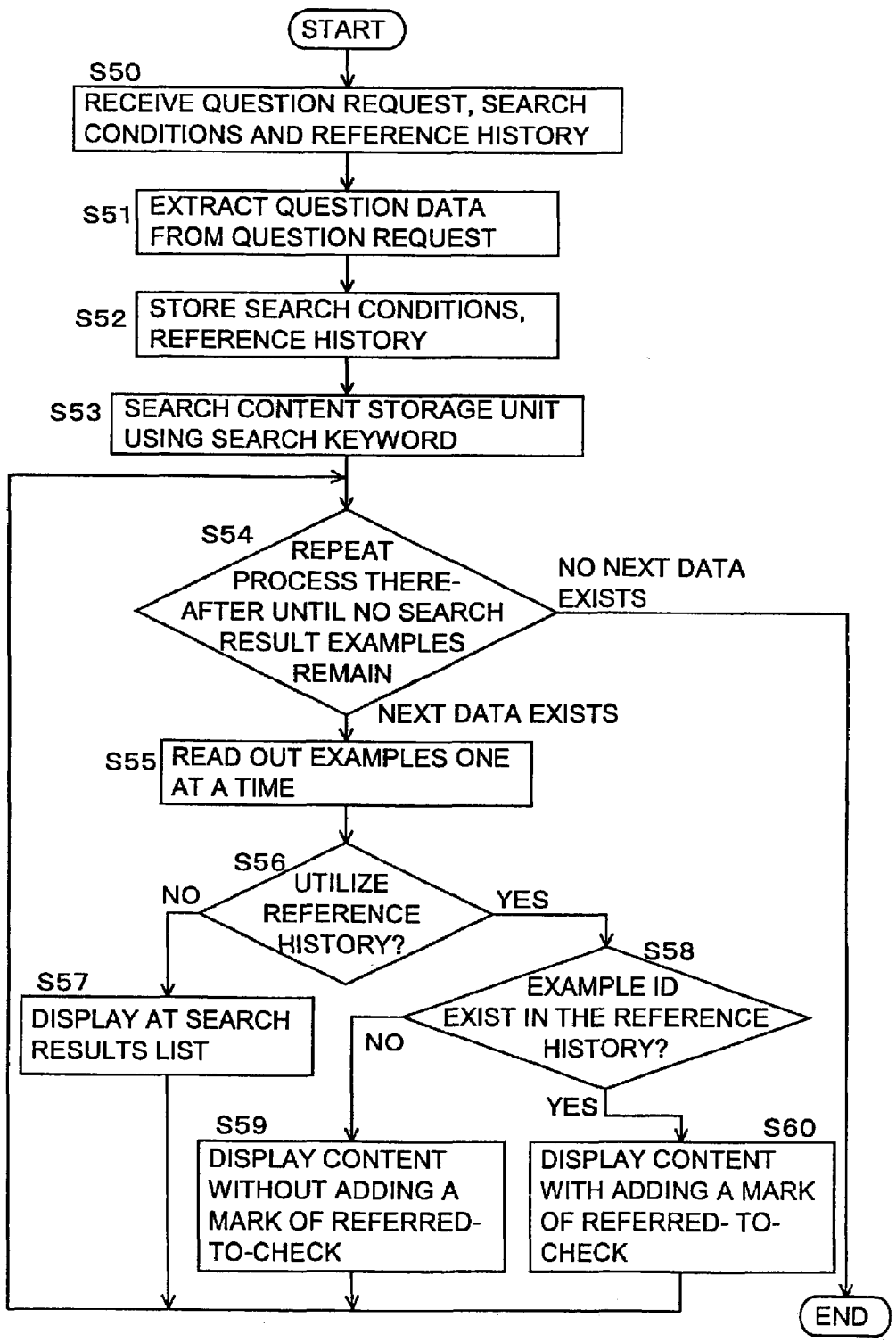
FIG. 14 is a view showing the process flow for operation questioning processing.
Figure 15:
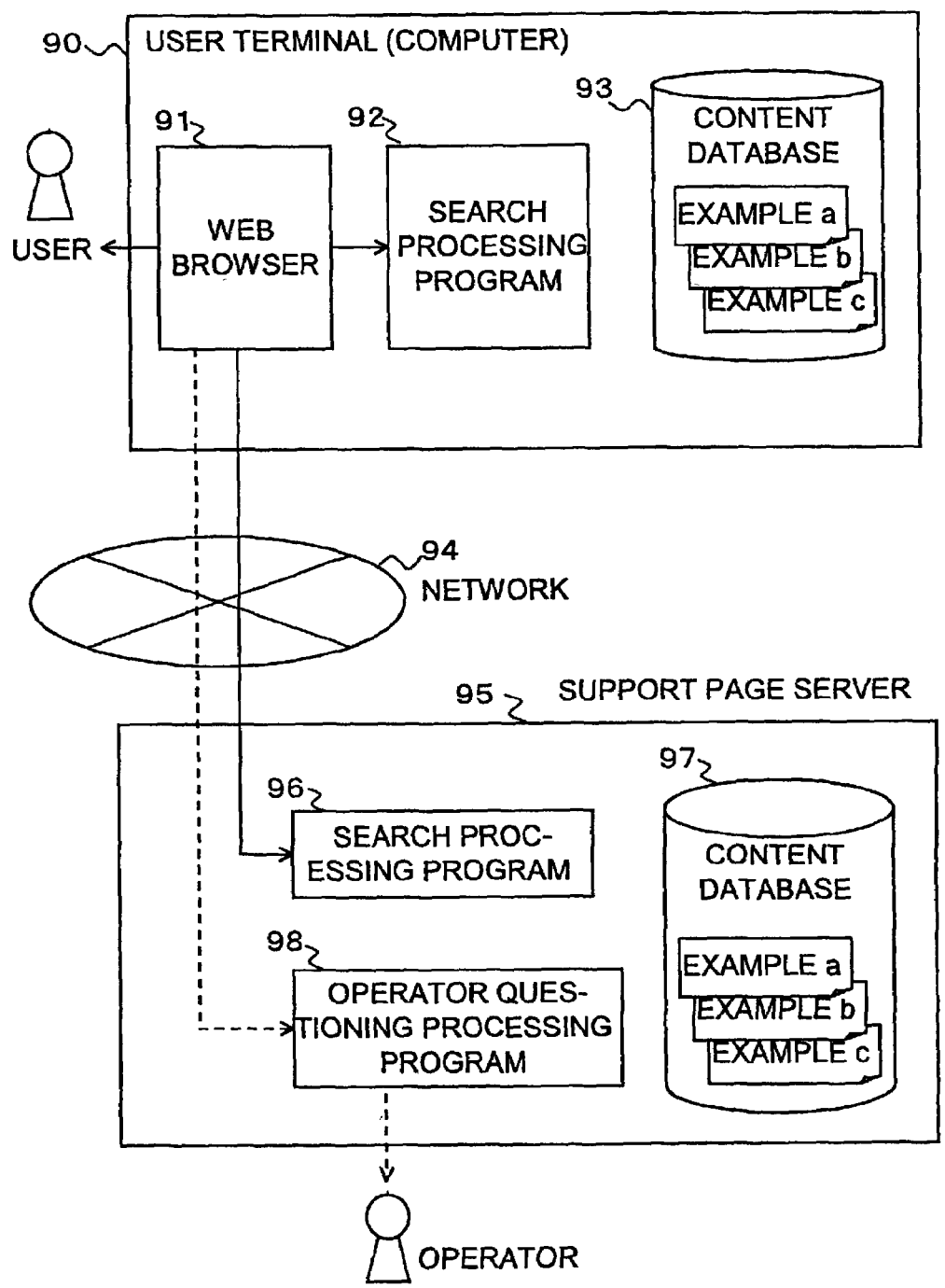
FIG. 15 is a view showing an example of a content search processing system.

A view showing the process flow for operation questioning processing is shown in FIG. 14. The operator question analyzer 26 of the support page server 2 receives a question request including question data for the operator, search conditions and reference history from the user terminal 1 (step S50). The search keywords are also passed over to the search processor 23 as search conditions, and question data is extracted from the question request and passed over to the information corresponding to questions display processor 27 (step S51). The reference history is then stored in the reference history storage unit 29 (step S52).

The search processor 23 searches the content storage unit 28 via the data manager 24 using search keywords received from the operator question analyzer 26 (step S53). The search processor 23 outputs examples with example IDs added as search results in the same manner as for the search results shown in FIG. 4. The process from step S55 to step S60 is then repeated for each of the examples in the search results until there is no longer any next example (step S54).

The information corresponding to questions display processor 27 extracts search results examples one at a time (step S55), and the operator utilizes the reference history to determine whether or not there is correspondence with the question (step S56). When the reference history is not utilized, the information corresponding to questions display processor 27 displays this example in a search results list of information corresponding to questions display window (not shown) for the operator (step S57). On the other hand, when the reference history is utilized, a determination is made as to whether or not the example ID of the extracted example exists in the reference history of the reference history storage unit 29 (step S58). When the example ID is not present, this example content is displayed in a search results list without adding a check mark to the effect that this has been referred to being added (step S59), and when the example ID does exist, then the example content is displayed in the search results list with adding a check mark for referred-to-check (step S60). The search results list of the information corresponding to questions display window for the operator can, for example, be displayed as shown for the example list display field 202 in FIG. 5.

As a result, it is possible for the operator to be aware of the question data and which examples the user from whom the question originates has already referred to, other examples the user has yet to refer to can be presented as responses, and effective processing corresponding to answers is possible. It is also possible to obtain responses in a more effective manner when questioning the operator because responses are not given to examples for which responses have already been given.

In the above, a description is given of practical implementations of the present invention but various modifications are possible within the scope of the present invention. For example, in this embodiment, when the search results of the content storage unit 28 of the support page server 2 are displayed, only examples with example IDs that are not in the reference history i.e. only examples that are not-yet referred to are displayed in the list as shown in FIG. 10. However, it is also possible to display all of the search results in a table and provide examples with example IDs existing in the reference history with a referred to mark. When the search results are displayed in a table, it is also possible for examples that do not have example IDs existing in the reference history (examples that have not yet been referred to) to be displayed towards the top of the list, and examples for which example IDs exist in the reference history (already referred to examples) to be displayed added to the end of the list, so that examples that have already been referred to are displayed near the bottom due to being of less importance.

The program implementing the present invention may be stored on an appropriate recording medium readable by computer such as portable memory media, semiconductor memory, or a hard disc, etc., and may be provided through recording on such a recording media, or through exchange utilizing various communications networks via a communications interface.

The present invention can be applied not only to support services for providing examples for resolving the problems of a user but also to cooperative systems for product catalog CD-ROMs and shopping sites. In this case, a product catalog CD-ROM storing product information consisting of product numbers, content and the like for each product distributed to the user corresponds to the content storage unit 15 of the user terminal 1 and a product information database storing the same product information as the product catalog CD-ROM on a shopping site server or a server corresponds to the support page server 2 and the content storage unit 28.

As described above, according to the present invention, when the content stored in the local area (user terminal) of the computer of the user and the content stored in the sever accessible over a network is similar or same, and when the user performs a content search over a network, the reference history of the user with respect to the content search results at the user terminal can be known at the server during content searches over the network. Display is then possible in such a manner that content that has already been referred to and content not yet referred to can be distinguished between as a result of the server displaying the results of searching content on the network with content the user has already referred to being deleted. In this way, the user can view search results that do not include content the user has already retrieved on their own computer so as to avoid the inconvenience of viewing the same content twice and so as to enable search results for a large amount of content existing at a support page to be viewed in an effective manner.

Further, according to the present invention, when a user questions an operator over a network, the server can be notified of the reference history of the user as well as operator question data and the like. The server then searches using the search results extracted from the question data and a search results list with the content the user has already referred to being marked is returned to the operator. As a result, more effective questioning where a user only inputs question data and does not disclose content already referred to and tried by the user when questioning the operator is possible. It is therefore also possible for the user to provide more effective answering by understanding the content already referred to by the user and therefore not including content that is not useful to the user.

Further, notification is given using identification information (for example, an example ID) that unifies all of the content already referred to for all of the content searches and operator questions, which is more effective from the point of view of management of the question information and operation.

What is claimed is:

1. A computer-readable medium for recording a program for searching individually a first content group stored in a first storage unit and a second content group in a second storage unit which contains similar content as the first content group, wherein the program causes a computer to execute the processes of:
    searching the first content group stored in the first storage unit using inputted search conditions;
    displaying a list of identification information of retrieved content as search results of the first content group;
    obtaining the identification information corresponding to content selected by a user from the search results of the first content group and storing the obtained identification information in a reference history storage unit;
    searching the second content group stored in the second storage unit using the inputted search conditions;
    obtaining identification information corresponding to retrieved content as search results of the second content group and determining whether or not the identification information corresponding to the content retrieved from the second content group exists in the reference history storage unit;
    distinguishing the identification information which exists in the reference history storage unit from the identification information which does not exist in the reference history storage unit: and
    displaying the identification information of the content retrieved from the second content group as search results so that the content having the identification information stored in the reference history storage unit is distinguished from the content not having the identification information stored in the reference history storage unit.

2. The computer-readable medium according to claim 1, wherein in the process of displaying the identification information as search results of the second content group, a mark showing referred-to is added only to retrieved content with identification information existing in the reference history storage unit for display.

3. The computer-readable medium according to claim 1, wherein in the process of displaying the identification information as search results of the second content group, only retrieved content whose identification information does not exist in the reference history storage unit is displayed.

4. A method for searching individually a first content group stored in a first storage unit and a second content group in a second storage unit which contains similar content as the first content group, the method comprising:
searching the first content group stored in the first storage unit using inputted search conditions;
displaying a list of identification information of retrieved content as search results of the first content group;
obtaining the identification information corresponding to content selected by a user from the search results of the first content group and storing the obtained identification information in a reference history storage unit;
searching the second content group stored in the second storage unit using the inputted search conditions;
obtaining identification information corresponding to retrieved content as search results of the second content group and determining whether or not the identification information corresponding to the content retrieved from the second content group exists in the reference history storage unit;
distinguishing the identification information which exists in the reference history storage unit from the identification information which does not exist in the reference history storage unit: and
displaying the identification information of the content retrieved from the second content group as search results so that the content having the identification information stored in the reference history storage unit is distinguished from the content not having the identification information stored in the reference history storage unit.

5. The method according to claim 4, wherein in the displaying the identification information as search results of the second content group, a mark showing referred-to is added only to retrieved content with identification information existing in the reference history storage unit for display.

6. The method according to claim 4, wherein in the displaying the identification information as search results of the second content group, only retrieved content whose identification information does not exist in the reference history storage unit is displayed.

7. A system for searching individually a first content group stored in a first storage unit and a second content group in a second storage unit which contains similar content as the first content group, the system comprising:
a first searching unit searching the first content group stored in the first storage unit using inputted search conditions;
a display unit displaying a list of identification information of retrieved content as search results of the first content group;
an first obtaining unit obtaining identification information corresponding to content selected by a user from the search results of the first content group and storing the obtained identification information in a reference history storage unit;
a second searching unit searching the second content group stored in the second storage unit using the inputted search conditions;
a second obtaining unit obtaining identification information corresponding to retrieved content as search results of the second content group and determining whether or not the identification information corresponding to the content retrieved from the second content group exists in the reference history storage unit;
a distinguishing unit distinguishing the identification information which exists in the reference history storage unit from the identification information which does not exist in the reference history storage unit; and
a display unit displaying the identification information of the content retrieved from the second content group as search results so that the content having the identification information stored in the reference history storage unit is distinguished from the content not having the identification information stored in the reference history storage unit.

8. The system according to claim 7, wherein when the identification information as search results of the second content group is displayed, a mark showing referred-to is added only to retrieved content with identification information existing in the reference history storage unit for display.

9. The system according to claim 7, wherein when the identification information as search results of the second content group is displayed, only retrieved content whose identification information does not exist in the reference history storage unit is displayed.

10. An operator questioning processing system, having a user terminal storing a first content group stored in a first storage unit and a server storing a second content group containing similar content as the first content group stored in a second storage unit, for carrying out processing for questioning by a user using search results of the first and second content group, wherein the user terminal comprises:
means for searching the first content group stored in the first storage unit using inputted search conditions;
mean for displaying a list of identification information of retrieved content as search results of the first content group;
means for obtaining the identification information corresponding to content selected by the user from the search results of the first content group and storing the identification information in a reference history storage unit;
means for inputting question data; and
means for sending the question data, the search conditions, and reference history to the server, and
the server comprises:
means for receiving the question data, the search conditions, and the reference history;
means for searching the second content group using the inputted search conditions; and
means for determining whether or not identification information of retrieved content as search results of the second content group exists in the reference history storage unit and for displaying a list of identification information of retrieved content as search results of the second content group so that the content having the identification information stored in the reference history storage unit is distinguished from the content not having the identification information stored in the reference history storage unit.

11. The computer-readable medium according to claim 1, wherein the displaying the identification information of the content retrieved from the second content group marks the identification information of the content of the second search result stored in the reference history storage unit and displays the marked identification information.

12. The computer-readable medium according to claim 1, wherein the displaying the identification information of the content retrieved from the second content group locates the identification information of content selected by the user at a head of the search results of the second content group.

13. The method according to claim 4, wherein the displaying the identification information of the content retrieved from the second content group marks the identification information of the content of the second search result stored in the reference history storage unit and displays the marked identification information.

14. The method according to claim 4, wherein the displaying the identification information of the content retrieved from the second content group locates the identification information of content selected by the user at a head of the search results of the second content group.

15. The system according to claim 7, wherein the displaying unit for displaying the identification information of the content retrieved from the second content group marks the identification information of the content of the second search result stored in the reference history storage unit and displays the marked identification information.

16. The system according to claim 7, wherein the displaying unit displaying the identification information of the content retrieved from the second content group locates the identification information of content selected by the user at a head of the search results of the second content group.

17. The operator questioning processing system of claim 10, wherein the means for determining marks the identification information of the content of the second search result stored in the reference history storage unit and displays the marked identification information.

18. The operator questioning processing system of claim 10, wherein the means for determining locates the identification information of content selected by the user at a head of the search results of the second content group.

* * * * *

UNITED STATES PATENT AND TRADEMARK OFFICE
CERTIFICATE OF CORRECTION

PATENT NO. : 7,065,519 B2
APPLICATION NO. : 10/307397
DATED : June 20, 2006
INVENTOR(S) : Hiroshi Yamaguchi It is certified that error appears in the above-identified patent and that said Letters Patent is hereby corrected as shown below:

Col. 12, line 52, change "unit:" to --unit;--

Col. 13, line 27, change "unit:" to --unit;--

Col. 14, line 33, change "mean" to --means--

Signed and Sealed this

Third Day of April, 2007

JON W. DUDAS
*Director of the United States Patent and Trademark Office*